United States Patent [19]

Sexton et al.

[11] 3,886,495

[45] May 27, 1975

[54] UPHOLE RECEIVER FOR LOGGING-WHILE-DRILLING SYSTEM

[75] Inventors: James H. Sexton, Duncanville; Bobbie J. Patton, Dallas, both of Tex.

[73] Assignee: Mobil Oil Corporation, New York, N.Y.

[22] Filed: July 10, 1974

[21] Appl. No.: 487,847

Related U.S. Application Data

[63] Continuation of Ser. No. 341,014, March 14, 1973, abandoned.

[52] U.S. Cl.... 340/18 LD; 340/18 NC; 340/18 FM; 175/50; 235/181

[51] Int. Cl. .......... G01v 1/40

[58] Field of Search ..... 340/18 NC, 18 CM, 18 LD, 340/18 P, 18 FM; 235/181, 183; 175/40, 50; 329/50, 137

[56] References Cited

UNITED STATES PATENTS

| | | | |
|---|---|---|---|
| 3,015,801 | 1/1962 | Kalbfell | 340/18 FM |
| 3,205,477 | 9/1965 | Kalbfell | 340/18 FM |
| 3,293,607 | 12/1966 | Kalbfell | 340/18 FM |
| 3,309,656 | 3/1967 | Godbey | 340/18 LD |
| 3,725,857 | 4/1973 | Pitts | 340/18 CM |

OTHER PUBLICATIONS

Gruenberg et al., "Handbook of Telemetering and Remote control," 1969, pp. 9–39 to 9–42, Published by McGraw Hill, P.O. No. TK399g7.

*Primary Examiner*—Maynard R. Wilbur
*Assistant Examiner*—N. Moskowitz
*Attorney, Agent, or Firm*—C. A. Huggett; William J. Scherback

[57] ABSTRACT

In a system for logging-while-drilling, an improved uphole receiver correlates a signal representing a received acoustic signal with a reference signal derived from the received acoustic signal to produce a synchronously rectified signal whose polarity is representative of the phase states of the received acoustic signal. The synchronously rectified signal is applied to a first integrator which is sampled at the end of each bit time interval. The synchronously rectified signal is also applied to a second integrator which is sampled at the midpoint of each bit time interval. This sampled voltage represents the phase error in the bit clock pulses defining the bit time intervals. A synchronous inverter changes the polarity of the error signal so that the polarity is the same regardless of the direction of polarity change of the synchronously rectified signal during the integration period of the second integrator. The error signal is suppressed when there is no change in polarity in the synchronously rectified signal during the integration time of the second integrator.

19 Claims, 18 Drawing Figures

| | | | |
|---|---|---|---|
| 3A | 3C | 3E | 3G |
| 3B | 3D | 3F | 3H |

PATENTED MAY 27 1975 3,886,495

SHEET 10

UPHOLE RECEIVER FOR LOGGING-WHILE-DRILLING SYSTEM

This a continuation of application Ser. No. 341,014 filed Mar. 14, 1973, now abandoned.

BACKGROUND OF THE INVENTION

This invention relates to logging-while-drilling systems and more particularly to an improved uphole receiving system for a phase modulation type system.

It has long been the practice to log wells, that is, to sense various downhole conditions within a well, and concomitantly therewith transmit the acquired data to the surface. Well logging operations performed by service companies today utilize wireline or cable-type logging procedures. In order to conduct the operations, drilling is stopped and the drill string removed from the well. It is costly to stop drilling operations in order to log. The advantages of being capable of logging-while-drilling are obvious. However, the lack of an acceptable telemetering system has been a major obstacle to a successful logging-while-drilling operation.

Various telemetering methods have been suggested for use in logging-while-drilling procedures. For example, it has been proposed to transmit the acquired data to the surface electrically. Such methods have in the past proven impractical because of the need to provide the drill pipe with a special insulated conductor and means to form appropriate connections for the conductor at the drill pipe joints. Other techniques proposed for use in logging-while-drilling operations involve the transmission of acoustic signals through the drill pipe. Exemplary of such telemetering systems are those disclosed in U.S. Pat. Nos. 3,015,801 and 3,205,477 to Kalbfell. In the Kalbfell systems, an acoustic energy signal is imparted to the drill pipe and the signal is frequency modulated in accordance with a sensed downhole condition. Frequency shift keying is employed to transmit the acquired data in a digital mode. Other telemetering procedures proposed for use in logging-while-drilling systems employ the drilling liquid within the well as the transmission medium. Of these perhaps the most promising is the technique described in U.S. Pat. No. 3,309,656 to Godbey. In the Godbey procedure, an acoustic wave signal is generated in the drilling liquid as it is circulated through the well. This signal is modulated in order to transmit the desired information to the surface of the well. At the surface the acoustic wave signal is detected and demodulated in order to provide the desired readout information.

U.S. Pat. No. 3,789,355 to Patton describes a logging-while-drilling system wherein telemetry of information to the surface of the well is accomplished by phase modulation of an acoustic signal. An acoustic signal is generated and transmitted upwardly through the drilling liquid to a remote uphole station. The acoustic signal is modulated between two phase states in response to digitally coded data bits produced as a function of a downhole condition. A change in phase represents a bit of one character and lack of change in phase represents a bit of a different character. An uphole receiving system produces an output signal representative of the phase and frequency of the acoustic signal. This is converted to bit clock pulses which define the bit time intervals and a bit value signal representing the generated bits.

SUMMARY OF THE INVENTION

In accordance with this invention a phase modulated logging-while-drilling signal is demodulated by correlating it with a reference signal to produce a synchronously rectified signal whose polarity represents the phase states of the logging-while-drilling signal.

The synchronously rectified signal is applied to a first integrator which is sampled and reset at the end of each bit time interval. In logging-while-drilling operations it is quite important that substantially all of the transmitted signal energy be utilized for detection. Only by doing this is it possible to successfully transmit the desired amount of information uphole. The correlation detection and subsequent integration provided by the system of this invention achieves this.

The synchronously rectified signal is also applied to a second integrator which is sampled to the midpoint of each bit time interval. The sampled voltage is an error signal representing the phase error in the bit clock control pulses defining the bit time intervals. In accordance with this invention, the phase error signal can be used to correct the phase of the bit clock control pulses.

In accordance with an important aspect of this invention, a synchronous inverter changes the polarity of the error signal so that the polarity is the same regardless of the direction of polarity change of the synchronously rectified signal during the integration period. Also, the error signal is suppressed when there is no change in polarity of the synchronously rectified signal in the integration time of the second integrator. In this way, the error signal truly represents the phase error of the bit clock control pulses. The phase of these bit clock control pulses can be changed so that they coincide with the polarity change in the synchronously rectified signal.

In accordance with another important aspect of this invention each bit time interval contains an integral number of cycles in the logging-while-drilling signal. The integral number is divided in a counter to produce bit clock control pulses which define the bit time intervals.

In accordance with another aspect of this invention the electrical signal representing the transmitted acoustic signal is applied to a band pass filter before the correlation detection. The band pass filter eliminates the second and higher harmonics of the acoustic signal which might otherwise be multiplied by the harmonics of the reference signal in the correlator.

Another object of this invention is to retrieve a very stable reference signal from the transmitted acoustic signal. Only with a very stable reference signal is it possible to retrieve substantially all the transmitted signal energy and subsequently decode the information which is phase encoded on the acoustic signal. The reference signal generator of this invention produces such a stable reference signal.

In accordance with this invention the reference signal generator contains a squarer and a phase lock loop. The squarer produces a signal without the modulating change in phase. This signal is applied to the phase lock loop. The phase lock loop produces a loop reference signal from which the reference signal is derived.

The phase lock loop further includes a phase detector which produces an error signal representing the error in phase between the loop reference signal and the squared signal. In accordance with another important aspect of this invention, a loop filter mixes the error signal and the integrated value of the error signal to produce a control signal. The amplitudes of the integral and error signal components are changed to change the acquisition time and the noise band width of the phase lock loop.

The foregoing and other objects, features and advantages will be better understood from the following more detailed description and appended claims.

DESCRIPTION OF THE DRAWINGS

FIGS. 4A, 4B, 5A, 5B, 6A and 6B show wave forms depicting the operation of the invention.

DESCRIPTION OF A PARTICULAR EMBODIMENT

Figure 1:
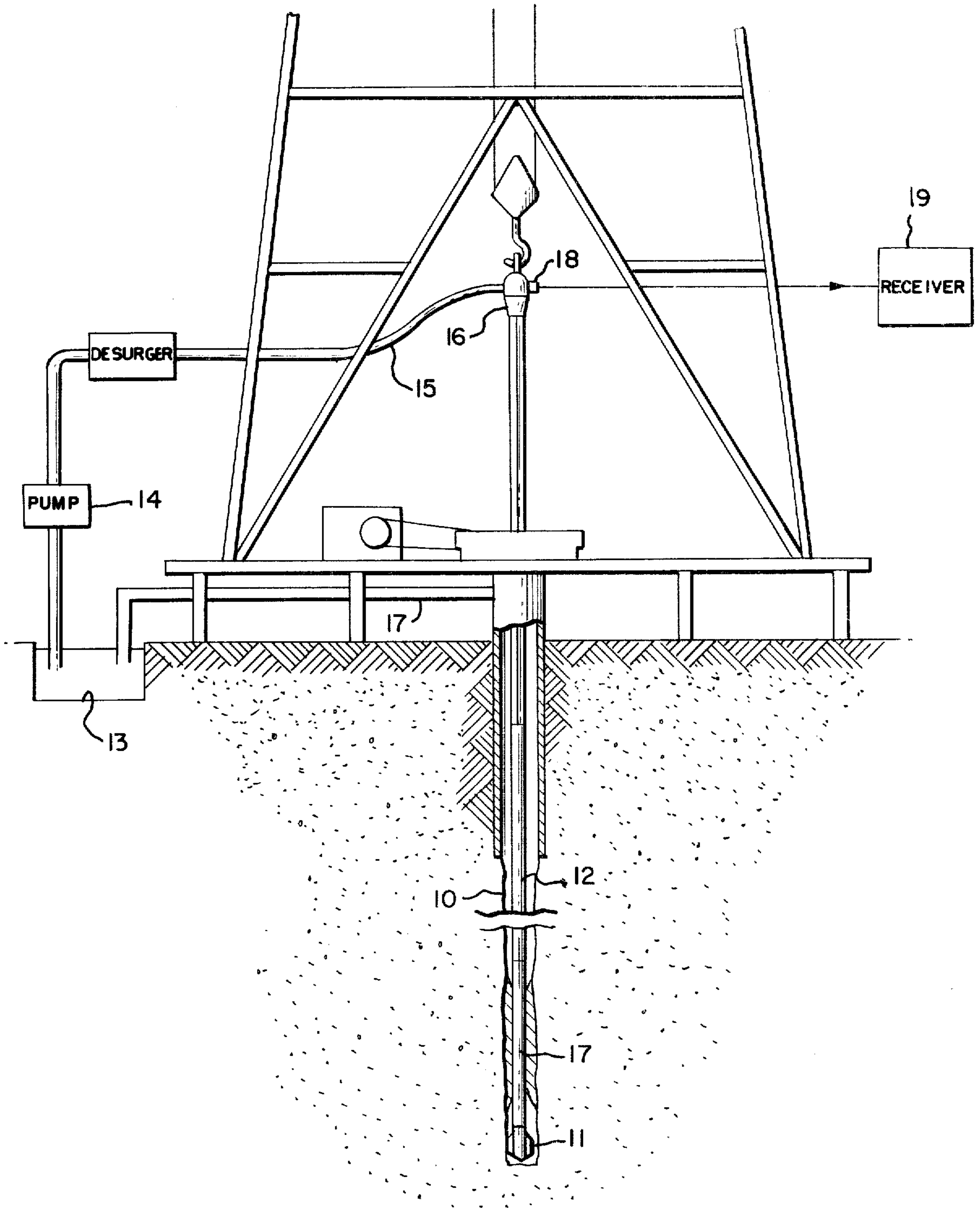
FIG. 1 depicts a logging-while-drilling system.
Figure 2A:
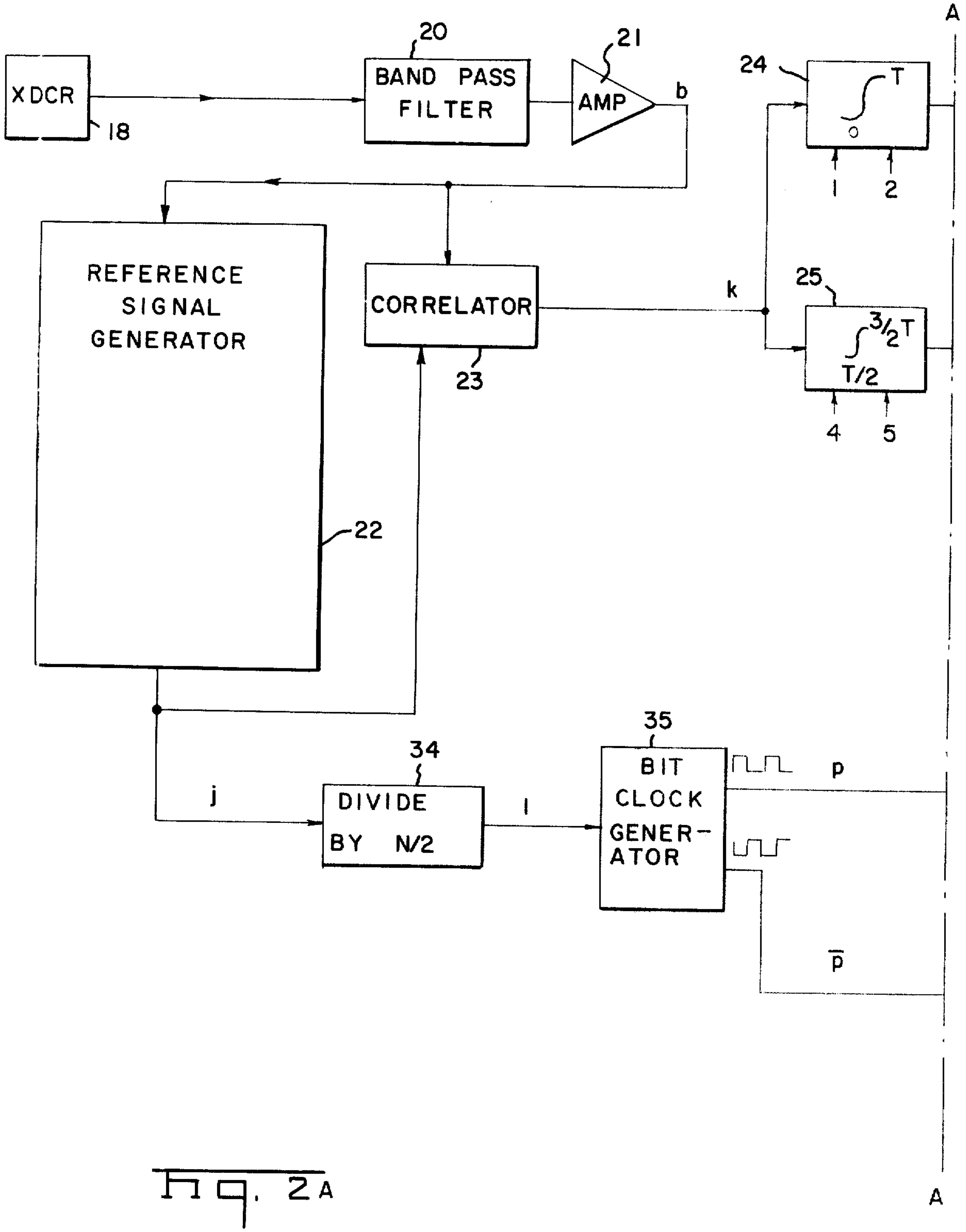
FIGS. 2*a*–2*b* is a block diagram of the uphole receiver of this invention.
Figure 2B:
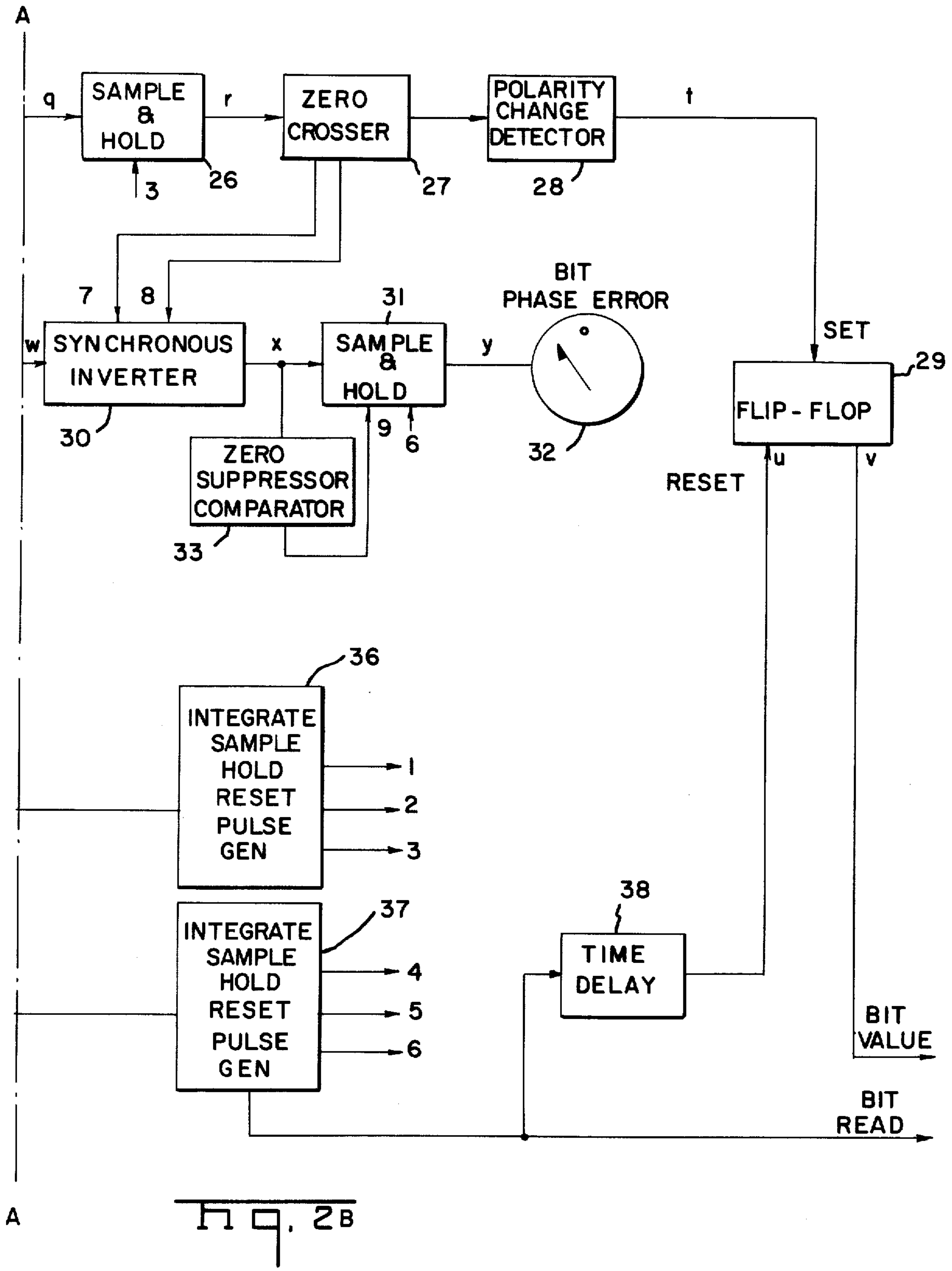
Figures 3, 3A:
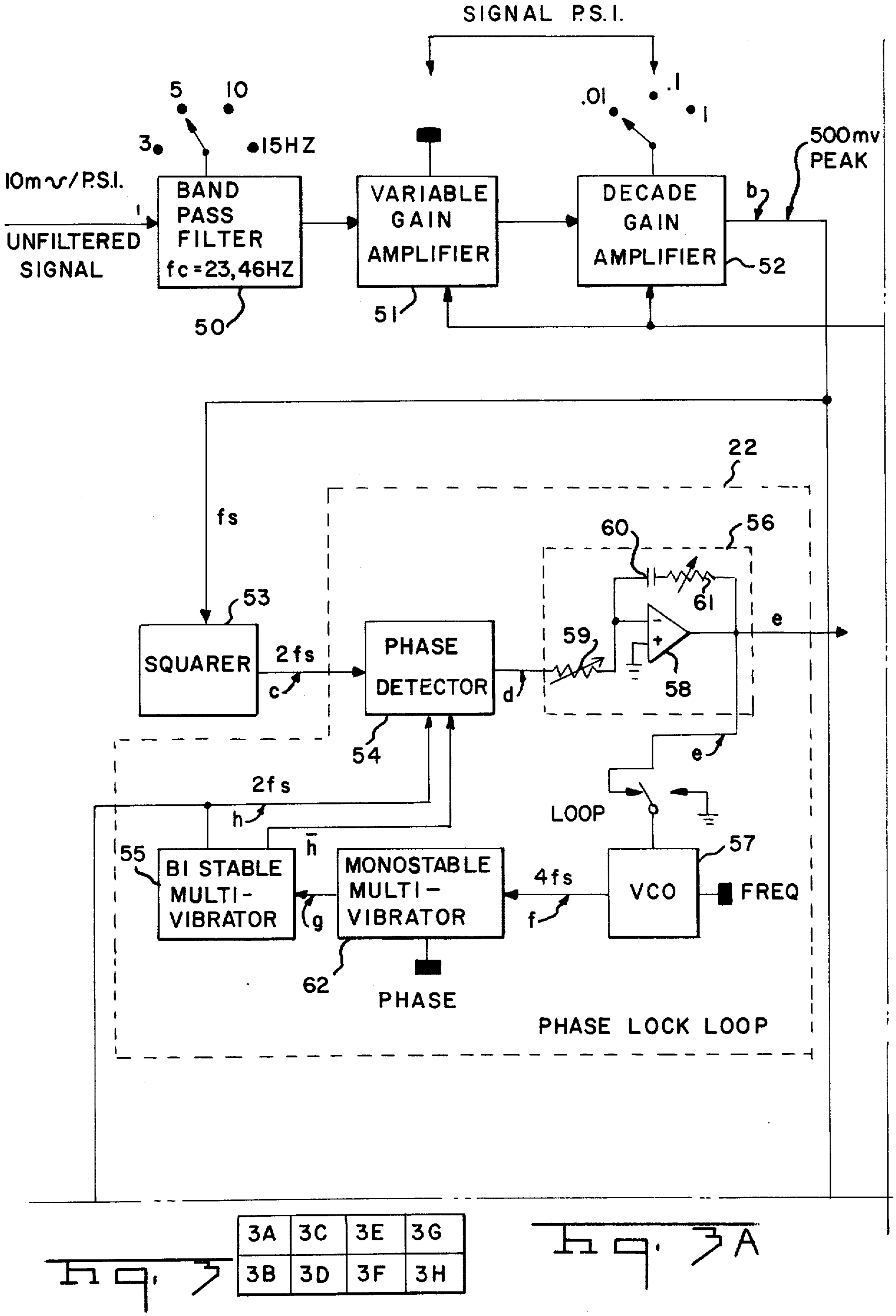
FIG. 3 shows how FIGS. 3A–3H fit together to form a more detailed schematic and block diagram of the uphole receiver.
Figure 3B:
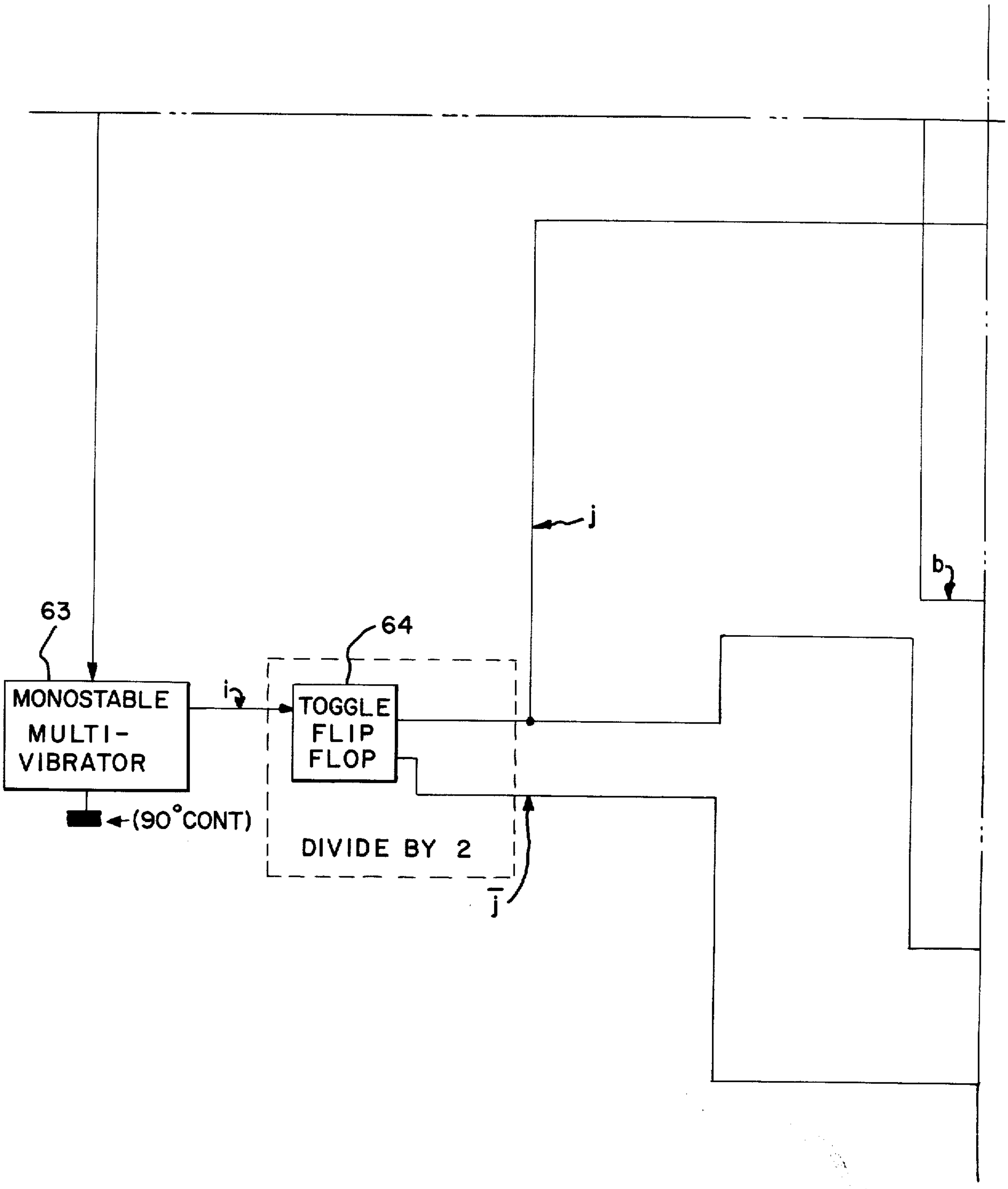
Figure 3C:
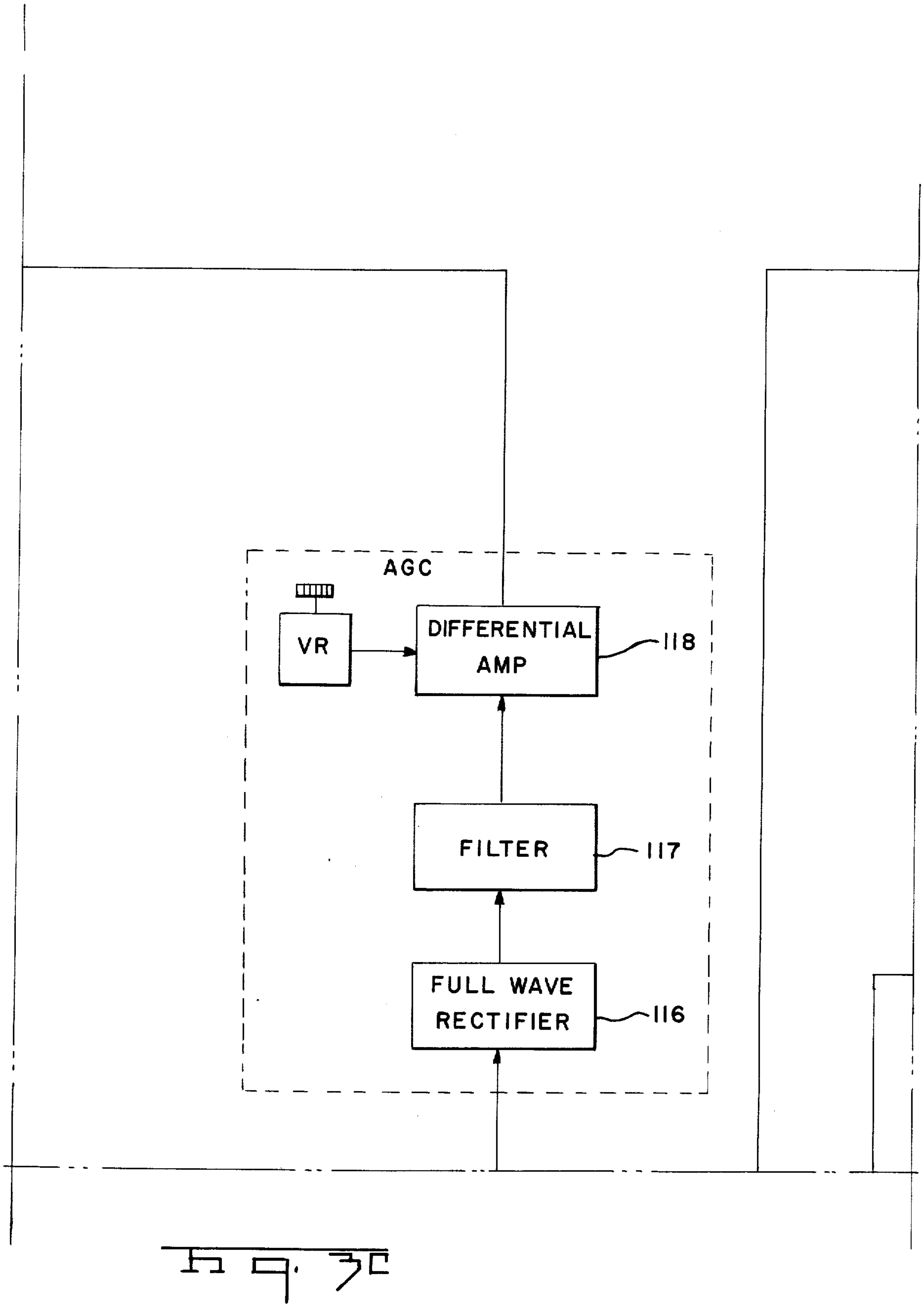
Figure 3D:
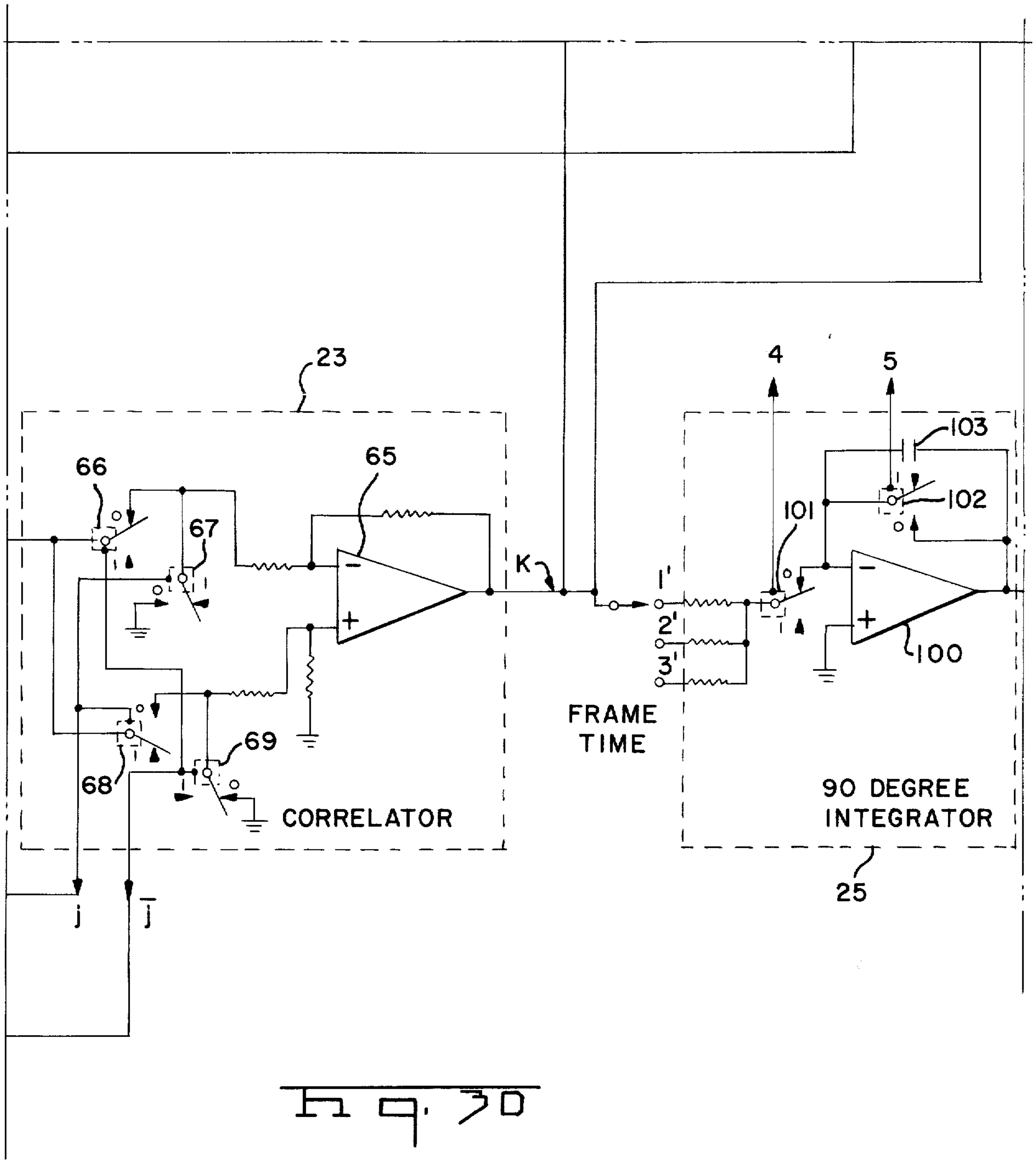
Figure 3E:
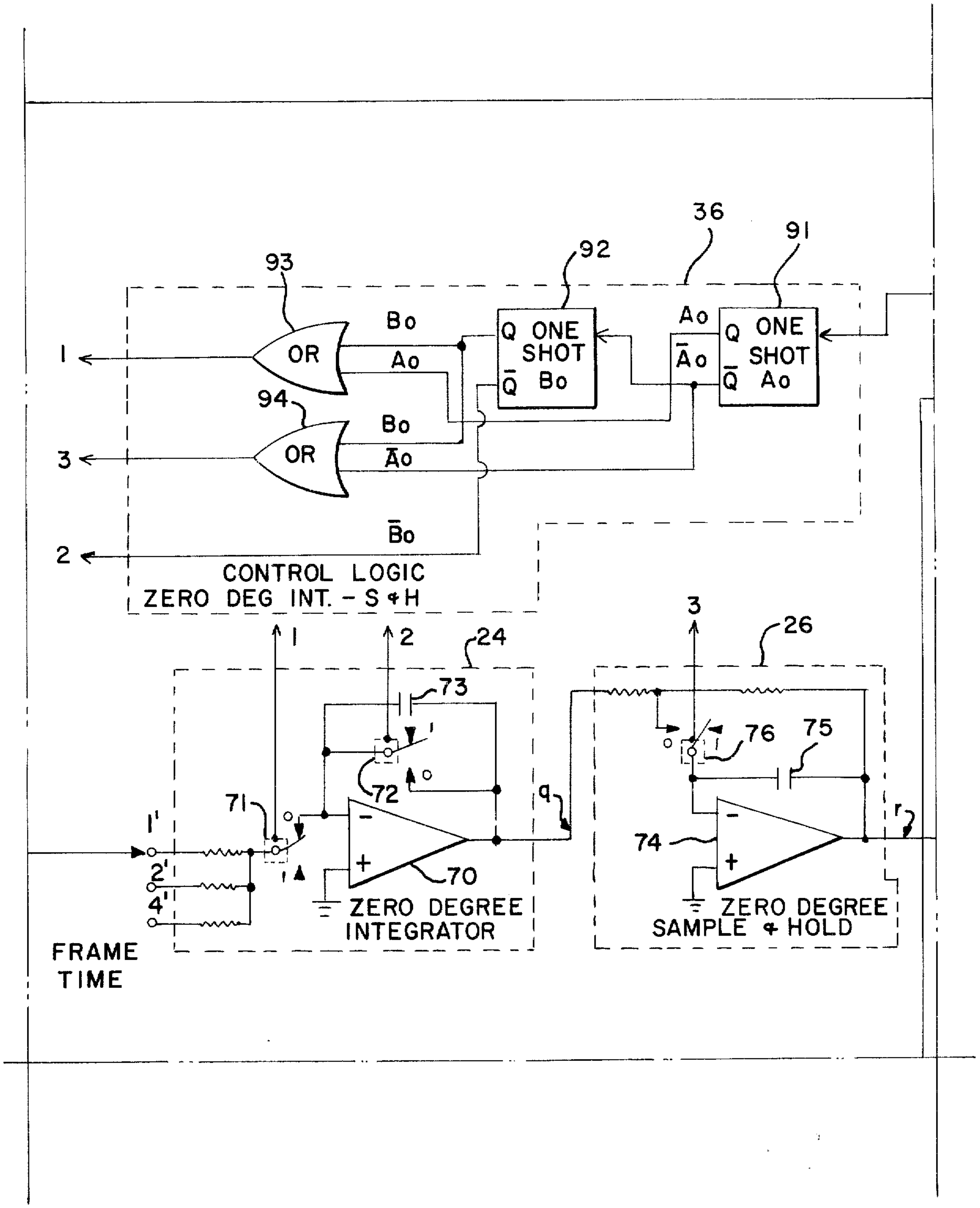
Figure 3F:
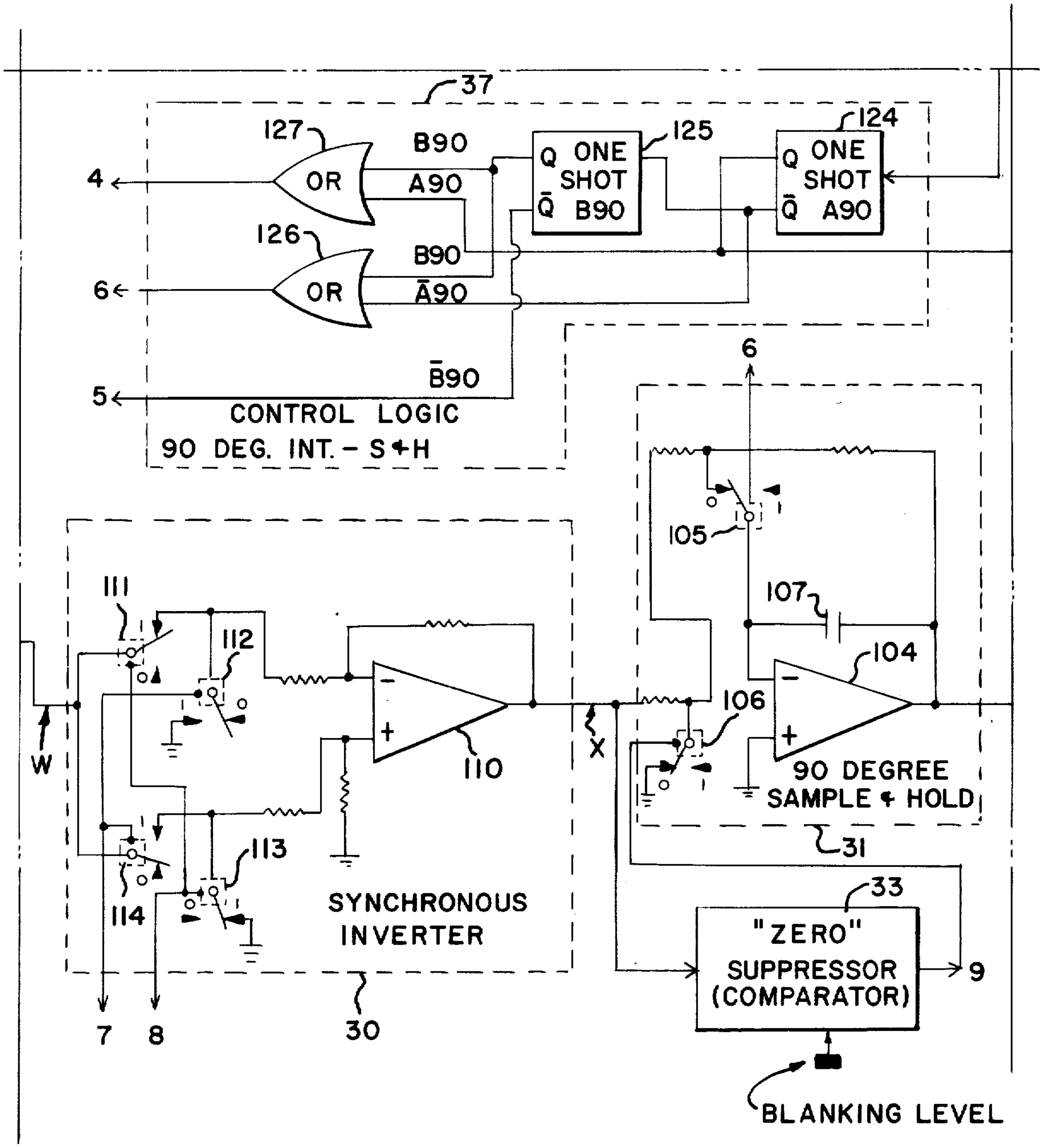
Figure 3G:
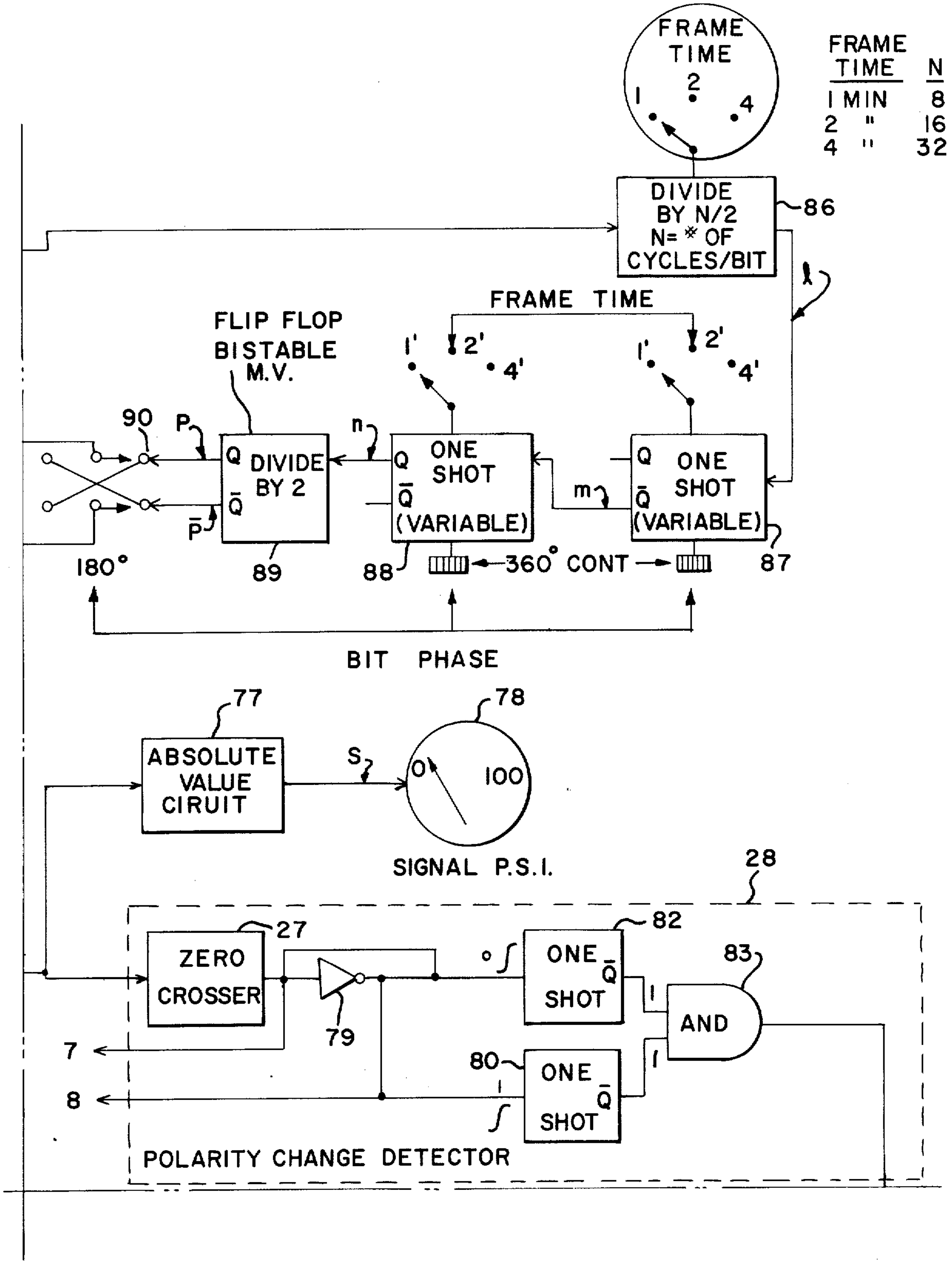
Figure 3H:
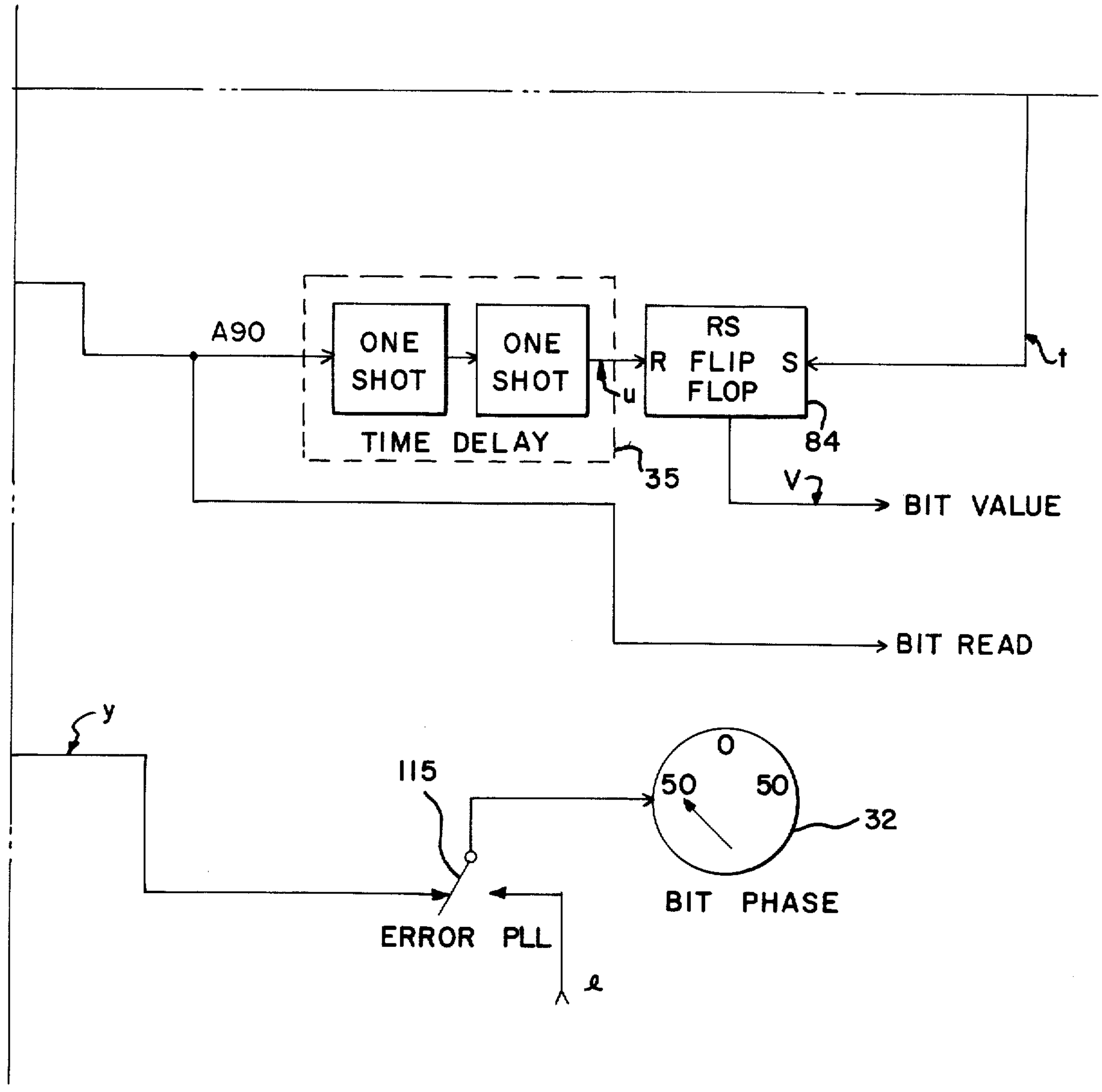

Table of Contents 1.00 The Logging-While-Drilling System, FIG. 1
2.00 The Uphole Receiving System, FIG. 2
3.00 The More Detailed Block Schematic Diagram, FIG. 3
3.01 Preconditioning Circuits
3.02 The Reference Signal Generator Including the Phase Lock Loop
3.03 Correlator
3.04 The First Integrator
3.05 Zero Crossing Circuitry for Producing Bit Value Signal
3.06 Bit Clock Generator
3.07 Set, Reset and Hold Pulse Generators
3.08 The Second Integrator
3.09 The Synchronous Inverter
3.10 Zero Suppressor Comparator
3.11 Adjustment to the Phase of the Bit Clock Pulses and the VCO Center Frequency
3.12 Automatic Gain Control Circuitry
4.00 Operation of the System

1.00 The Logging-While-Drilling System

FIG. 1 depicts a well 10 which is being drilled by a drill bit 11 attached to the lower end of a drill string 12. Drilling liquid from a container 13 is circulated by a pump 14 through a conduit 15 into the swivel 16 and then downwardly through the interior passage of the drill string to the bit 11. The drilling liquid passes outwardly into the well bore through appropriate ports in the drill bit and is circulated to the surface of the well through the annulus between the drill string and the wall of the well. At the surface, the mud is withdrawn from the annulus through a conduit 17 and recirculated to the container 13.

Located within the drill string 12 near the drill bit is a logging tool 17 which includes one or more logging transducers for sensing downhole conditions and an acoustic generator for imparting an acoustic signal to the drilling liquid. The acoustic generator is of a type which imparts a pressure wave signal to the drilling liquid. This signal is of sufficient amplitude for transmission to the uphole location. A particularly good generator is the rotary valve transmitter of the type disclosed in the aforementioned Godbey patent.

The phase of the acoustic signal is varied in response to a downhole condition sensed by the logging transducer. At the surface, the acoustic signal is recovered from the drilling liquid by means of one or more receiving transducers which convert the acoustic signal to an electrical signal. As shown in FIG. 1 the transducer 18 is mounted on the upper section of swivel 16. The signal from transducer 18 is applied to the uphole receiving system 19 of this invention. The receiving system 19 demodulates the signal to produce bit value signals representative of the measured downhole conditions.

2.00 The Uphole Receiving, FIG. 2

Figure 4A:
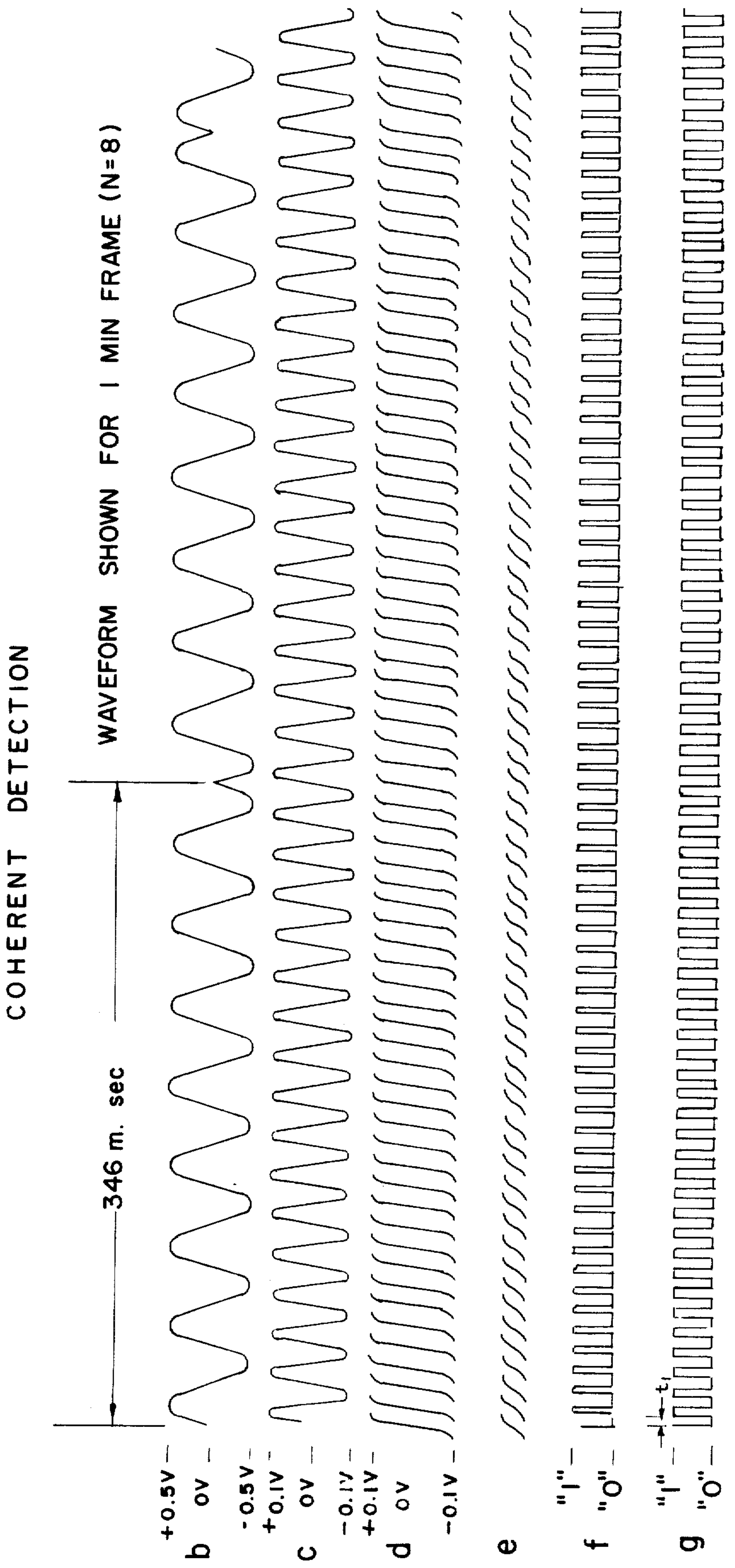

The phase shift keying system described in U.S. Pat. No. 3,789,355 to Patton, METHOD OF AND APPARATUS FOR LOGGING-WHILE-DRILLING, is particularly suitable for producing the acoustic signal. The receiving system of this invention will be described as demodulating the acoustic signal received from that system. FIG. 2 shows a block diagram of the receiver. The output of the transducer 18 is applied to a band pass filter 20 which eliminates the harmonics in the acoustic signal which might otherwise be multiplied by harmonics in the reference signal during the correlation detection. The output of the band pass filter is applied to an amplifier 21. Transducer 18, band pass filter 20 and amplifier 21 produce an output signal which is representative of the phase and frequency of the received acoustic signal. (The output signal *b* is shown in FIG. 4A. The reference characters, such a "b" on FIG. 2 at the output of amplifier 21, correspond with the wave forms in FIGS. 4, 5 and 6.)

The output signal is applied to a reference signal generator 22 which includes a phase lock loop. (Phase lock loops are described in Phase Lock Techniques by Floyd M. Gardner, John Wiley and Sons, 1966.) Reference signal generator 22 produces a reference signal *j*.

The reference signal and the output signal are applied to a correlator 23 which produces a synchronously rectified signal *k* whose polarity is representative of the phase states of the output signal.

The syschronously rectified signal is applied to a first integrator 24 and to a second integrator 25. The first integrator 24 is sampled and reset at the end of each bit time interval. The sample and hold circuit 26 holds the sampled output of the integrator.

Zero crossings in the output of sample and hold circuit 26 are detected by the zero crosser 27. A polarity change detector 28 produces pulses, one pulse for each detected "1" bit. These pulses set the flip-flop 29 which produces the bit value signal as an output thereof.

The second integrator 25 is sampled at the midpoint at each of the bit time intervals. The integrated synchronously rectified signal should be zero at the midpoint of each bit time interval if the bit clock control pulses are symmetrically framing the polarity changes in the synchronously rectified signal. Any deviation from this zero value is representative of a phase error in the bit clock control pulses.

Synchronous inverter 30 changes as necessary the polarity of the output of the second integrator so that the polarity is the same irrespective of the phase state of the synchronously rectified signal. The zero crosser 27 produces control signals which operate the synchronous inverter 30. For example, if the signal *r* is negative, then the synchronous inverter applies the uninverted waveform *w* to the sample and hold circuit 31. On the other hand if signal *r* is positive, the synchronous inverter inverts the waveform w before applying it to the sample and hold circuit 31. The output of the sample and hold circuitry 31 is an error signal representing the phase error in the bit clock control pulses. This error signal is shown applied to the meter 32 which provides an indication of the bit phase error and which can be used to adjust the bit clock generator so that the bit clock control pulses do accurately define the bit time intervals.

One further correction is applied to the bit phase error signal. The comparator 33 compares the integrated output of the synchronous inverter 30 to a given level. If there is no change in phase state during the integration time of the second integrator 25, the comparator 33 suppresses the error signal during this time. (No change in phase state corresponds with the transmission of "0".) The reason for this is as follows:

The integration time interval of second integrator 25 is symmetrical about the boundaries of the bit time interval. When there is a phase state change at a bit time interval boundary (correct bit phase), the output of integrator 25 is zero due to integration of the synchronously rectified signal while it had opposite polarities for equal times. Whenever there is asymmetry of the integration time interval of second integrator 25 about a phase state change, integrator 25 produces a bit phase error signal which is proportional to the bit phase error. For a "0" transmission, there is no phase state change; consequently, the output of second integrator 25 is not representative of bit phase error and is suppressed by comparator 33.

Frequency divider 34 divides the reference signal, waveform *j*, by N/2, half the number of output signal cycles per bit, producing waveform 1 which drives bit clock generator 35. The bit clock generator 35 produces the waveform *p* and its complement $\overline{p}$. These two signals are used to generate the bit clock control pulses for the integrators 24 and 25 and sample and hold circuits 26 and 31. The circuit 36 generates the bit clock control pulses "1" and "2" which determine the integrate, hold and reset modes of integrator 24 and bit clock control pulse "3" which determines the sample and hold modes of sample and hold circuit 26. Similarly, circuit 37 controls the operational modes of integrator 25 and sample and hold circuit 31 with bit clock control pulses "4", "5" and "6." Additionally, circuit 37 produces the bit read pulses.

The bit read pulses are delayed in time by the time delay 38 which resets the bit value flip-flop 29.

3.00 The More Detailed Block Schematic Diagram, FIG. 3

3.01 Preconditioning Circuits

The output from the transducer is applied to the band pass filter 50 which is tuned to the signal frequency. The band pass filter has adjustable band width to provide optimal filteriing at different data rates and signal-to-noise ratios. Since the acoustic signal is not a pure sign wave, it has harmonic content. The band pass filter cuts off these harmonics.

The variable gain amplifier 51 and the decade gain amplifier 52 are manually settable. The time constant of the phase lock loop depends on the amplitude of the signal. That is, the acquisition time is a function of the signal amplitude. Therefore, the amplifiers 51 and 52 are set to obtain optimum acquisition time of the phase lock loop. The amplifiers 51 and 52 are also under automatic gain control as will be subsequently described.

3.02 The Reference Signal Generator Including the Phase Lock Loop

The output signal from the preconditioning circuits is applied to the squarer 53. This circuit doubles the frequency of the output signal. This destroys the phase state information contained in the output signal because a 180° phase shift in the output signal becomes a 360° phase shift at the output of the squarer 53. The squared signal (waveform *c*) is applied to the phase detector 54. Such a detector is described in more detail in section 3.03. It produces a full wave synchronously rectified signal by multiplying the input waveform *c* by +1 or −1. The +1 and the −1 result from outputs of the bistable multivibrator 55. The output of the phase detector 54, is an error signal with waveform *d*. It has an average value of zero when the loop is in lock.

The loop filter 56 includes amplifier 58, capacitor 60 and variable resistors 59 and 61. This filter produces a control signal *e* with two components, one of which is proportional to the error signal *d* and another of which is proportional to the integral of the error signal *d*. The magnitude of each component and their ratio is controllable by means of variable resistors 59 and 61 in conjunction with capacitor 60. The integral component primarily determines the bandwidth of the filter which in turn largely determines the acquisition time of the phase lock loop and its noise rejection properties. The error signal component primarily determines the damping properties of the filter.

The signal-to-noise ratio of the output signal generally decreases with depth in the well and it is sometimes necessary to provide additional noise rejection in the phase lock loop 22 by decreasing the integral component thus decreasing the bandwidth of the loop filter 56. Consequently, the acquisition time is longer so that is is important to adjust resistors 59 and 61 to achieve a bandwidth which provides a just adequate noise rejection thus maintaining the fastest acquisition time compatible with the existing signal-to-noise ratio.

It will be appreciated that it is desirable for the loop to lock, that is produce a stable reference, quite quickly after start up. Otherwise, the first few bits transmitted from downhole will be lost. While fast acquisition is always desirable, sometimes it is not possible when there is noise on the signal. Therefore, the loop filter is set to have a high error signal component to give fast acquisition when there is a relatively good signal-to-noise ratio, usually at shallow depths. However, as the signal-to-noise ratio deteriorates, usually at deeper depths, the fast acquisition time is sacrificed by increasing the relative amplitude of the integral component in the control signal. At deeper depths, it's desirable to narrow the band pass. To do this, the resistance of resistor 59 is increased. This decreases the integral component. Now it is necessary to change the damping of the filter to maintain optimum acquisition time consistent with this new bandwidth and resistor 61 provides the means to do this.

Resistors 59 and 61 are simultaneously adjusted for good damping which optimizes the acquisition time for a given bandwidth. (See the aforementioned Gardner book for a description of the required adjustments.) We have obtained good results with bandwidths of 1, 0.1 and 0.01 Hz. The damping is best maintained from slightly underdamped to near critical. We have found damping coefficients near 0.5 (damping coefficient as used by Gardner) to be best. A range of approximately 0.3 to 1.0 is acceptable.

The output of the loop filter 56 is applied to the voltage controlled oscillator 57. This produces a signal having a frequency 4 times the sonic frequency $f_s$. A variable monostable multivibrator 62 provides a means for varying the phase of this signal to produce the phase shifted signal *g*. The output of the multivibrator 62 is divided by 2 in the bistable multivibrator 55 to produce a loop reference signal at a frequency twice that of the sonic signal $f_s$. This reference signal is compared with the squared signal *c* at a frequency of $2f_s$ in the phase detector 54.

The nature of reference signal generator 22 is such that loop reference signals *h* and $\bar{h}$ acquire and maintain a constant quadrature phase relationship to squared signal *c* which has a constant phase relationship with the output signal *b*. Although the phase lock loop as described acquires phase lock automatically, it is sometimes desirable to assist phase lock acquisition by adjusting the phase shift produced by monostable multivibrator 62 thus acquiring phase lock immediately.

A monostable multivibrator 63 provides a means for changing the phase of the loop reference signal *h*. The loop reference signal at a frequency of $2f_s$ is divided by 2 in the flip-flop 64 to produce the highly stable reference signal with a waveform *j* and its complement $\bar{j}$. Monostable mulitvibrator 63 is initially adjusted (one time only) to provide a phase shift such that reference signal *j* is exactly in phase with one of the phase states of output signal *b* providing for ideal operation of correlator 23.

3.03 Correlator

The reference signal and its complement (waveforms *j* and $\bar{j}$) are applied to the correlator 23. The output signal (waveform *b*) is also applied to the correlator. The correlator includes a unity gain operational amplifier 65 and four logic controlled analog switches represented by the switches 66–69. When the reference signal *j* is at a "1," representative switch 68 is in the "1" position, the lower position. When reference signal *j* is at a "0," representative switch 68 is in its upper, "0" position. (In actual practice, the switch 68 is solid state logic circuitry but the description is facilitated by considering the equivalent switch.) Switches 66, 67 and 69 operate similarly. The result is that the output signal, waveform *b* is applied to either the inverting or non-inverting input of amplifier 65 depending upon the logic state of the signals *j* and $\bar{j}$. When *j* is a "1" and $\bar{j}$ is "0," the output signal *b* is applied to the inverting input of operational amplifier 65 and the non-inverting input is grounded. When *j* is "0" and $\bar{j}$ is "1," the output signal *b* is applied to the non-inverting input and the inverting input is grounded. The result is that the output signal *b* is effectively multiplied by a plus 1 or a minus 1 to produce the synchronously rectified signal having the waveform *k*.

3.04 The First Integrator

The first integrator 24 includes operational amplifier 70 and logic controlled analog switches represented by the switches 71 and 72. Capacitor 73 is connected across the operational amplifier to form an integrator. Integration of the synchronously rectified signal starts when the control line 1 goes to a "0." (This is represented by the switch 71 being moved to its upper position.) Integration is terminated when the control line 1 goes to the "1" position. (This is represented by the switch 71 being moved to its lower position.)

The output of the zero degree integrator is sampled and held by the circuit 26. This includes operational amplifier 74, capacitor 75 and a logic controlled analog switch represented by the switch 76. When the control line 3 goes to a "0" condition, the switch 76 conducts causing sample and hold 26 to sample the output of integrator 24. (This is represented by the switch 76 being moved to its left hand position.)

3.05 Zero Crossing Circuitry for Producing Bit Value Signal

The absolute value of the output of the sample and hold 26 provides information about the amplitude of the received sonic signal. The absolute value circuit 77 is connected to a meter 78 which indicates this absolute value.

It is desirable to convert the output of sample and hold 26 to a bit value signal which is synchronized with bit clock control pulses to provide an output indicating bit value as a function of time. The zero crossing circuit 27 produces a "0" output if the signal *r* is positive and it produces a "1" output if *r* is negative. The output of the zero crosser circuit 27 is applied to the control line 7 which along with control 8 controls the synchronous inverter as will be subsequently described. It is also applied to one shot 82. Logic inverter 79 produces the complement of the signal on control line 7. The complement signal is applied to one shot 80 and to control line 8.

A plus to minus transition in the output of sample and hold 26 is effective through zero crosser 27 in triggering one shot 82. A minus to plus transition in the output of sample and hold 26 is effective through zero crosser 27 and inverter 79 in triggering one shot 80. When either one shot is triggered, it acts through AND gate 83 to set the flip-flop 84. When flip-flop 84 is set the bit value line has a "1" output thereon. Bit read pulses delayed by time delay 35 reset flip-flop 84.

3.06 Bit Clock Generator

The reference signal, waveform *j*, is applied to the frequency divider 86. In the example under consideration, there are eight cycles in every bit interval. The reference signal is divided by 4 to produce the waveform 1. Waveform 1 is time delayed by one shots 87 and 88 producing the waveform *n* which is effectively phase shifted with respect to waveform 1. Divider 89 divides the waveform *n* by 2 producing the complementary square wave bit clock signals P and $\bar{P}$. Switch 90 applies P to to control logic 36 and $\bar{P}$ to control logic 37 or conversely. Consequently, the bit clock signals P and $\bar{P}$ are at the bit frequency and have a phase which is adjustable. The range of the continuous phase adjustment provided by variable one shots 87 and 88 is slightly less than 1 bit time interval. Switch 90 effectively selects one of two bit phase conditions different by ½ bit time interval, which, in conjunction with one shots 87 and 88 provides a total bit phase adjustment of slightly less than 3/2 of a bit time interval. Either P or $\bar{P}$, depending on the position of switch 90, is applied to one shot 102 which produces the bit read pulse $A_{90}$.

3.07 Set, Reset and Hold Pulse Generators

A first set of bit clock control pulses for the first integrator are generated by the one shot multivibrators 91 and 92. Control pulses 1, 2 and 3 occur at the boundaries of the bit intervals and perform the functions of starting the first integrator, resetting it, and sampling its output. The generation of control pulses 1, 2 and 3 is initiated by the positive going edge of the waveform P (or alternatively by $\overline{P}$ depending on the position of switch 90). The first integrator is reset upon the occurrence of the pulse $B_o$ from one shot multivibrator 92. Then it integrates the synchronously rectified signal *k* during the entire bit interval. The integrator is switched to a hold position at the end of the bit interval. When pulse $A_o$ is produced from the one shot 91, control line 1 goes to a "1," control line 2 remains at "1," and control line 3 goes to a "0." During the time that pulse $A_o$ persists the output of the first integrator is sampled.

Upon the occurrence of the pulse $B_o$ the integrator is reset. Control line 1 remains at a logic "1." Line 2 changes to a logic "0" and line 3 changes to a logic "1."

The integrator begins integrating at the end of the pulse $B_o$. At this, time control line 1 changes to a "0;" line 2 changes to a "1" and line 3 remains at the "1" level.

3.08 The Second Integrator

The second integrator includes operational amplifier 100, logic controlled analog switches represented by the switches 101 and 102 and a capacitor 103. The sample and hold circuit for the second integrator includes the amplifier 104 and logic controlled analog switches represented by the switches 105 and 106 and capacitor 107.

The set of bit clock control pulses which start and reset the integrator and sample its output are generated by the set, reset, hold pulse generator 37. This includes one shot multivibrators 124 and 125 and OR gates 126 and 127. The operation of these circuits in producing the start, reset and hold functions for the integrator 25 are the same as previously described with reference to the circuit 36. However, since complement wave form $\overline{P}$ (or P when $\overline{P}$ triggers control logic 36) triggers the one shot multivibrators 124 and 125, the control pulses on lines 4, 5 and 6 are ½ bit time intervals out of phase with the control pulses on lines 1, 2 and 3. As a result, the 90° integrator 25 is sampled at the midpoint of each bit time interval. If the bit clock control pulses are accurately framing the bit time intervals, the output of the second integrator 25 should be zero when it is sampled. Any deviation from zero will be an error signal which can be used to bring the bit clock control pulses back into correct bit phase.

3.09 The Synchronous Inverter

The synchronous inverter 30 includes amplifier 110 and logic control analog switches represented by the switches 111–114. The zero crosser 27 detects the sign of the integrated signal, waveform *r*. If *r* is positive, synchronous iverter 30 multiplies the output of second integrator 25 by a minus 1. If *r* is negative the output of the second integrator 25 is multiplied by a +1. Stated another way, if *r* is negative, the output of the synchronous inverter *x* is equal to $+w$; if *r* is positive, $x = -w$.

The zero crosser 27 produces a control signal on control line 7 which is a "0" if *r* is positive and the complement signal on control line 8 of a "1". This sets switch 111 to its upper position and switch 114 to its lower position so that *w* is applied to the inverting input of amplifier 110. Switch 113 grounds the non-inverting input. Similarly, when *r* is negative, the signal *w* is applied to the non-inverting input of operational amplifier 110. The reason for performing this synchronous inversion is to produce the waveform *x* which has, at the end of the integration period of integrator 25, a magnitude proportional to the amount of bit phase error and a sign indicating the direction (leading or lagging) of the phase error. If the bit clock control pulses are equally spaced on either side of a phase state transition of waveform *k* the waveforms *x* and *w* are zero at the end of integration of integrator 25. However, if the bit clock control pulses are out of phase so that integrator 25 starts integrating early, waveform *w* will, at the end of integration of integrator 25, have a value proportional to the time that integration was started early. Note that it is desired to have a signal whose sign is the same regardless of whether there is a plus to minus transition or a minus to plus transition in the synchronously rectified signal in the bit time interval. In either case it is desired to produce a signal indicating that the bit clock control pulses are occurring slightly too early in time. Because the synchronous inverter reverses the polarity of waveform *w* when there is a minus to plus transition in the synchronously rectified signal, the waveform *x* will be the same sign for the same phase error regardless of the direction of transition of the synchronously rectified signal.

3.10 Zero Suppressor Comparator

Phase error in the bit clock control pulses can be determined only during those intervals in which there is a phase state transition in the waveform *k* during an integration time of integrator 25. For intervals in which there is no transition, this signal is not a measure of bit phase error and must be suppressed. During intervals in which there is no transition, the second integrator 25 will continue to integrate in one direction throughout the entire interval. This produces an integrated waveform *x* which is well above a given magnitude. The comparator 33 produces an output on control line 9 when the waveform *x* goes above a predetermined blanking level. The "0" output from comparator 33 sets the logic controlled analog switch represented by switch 106 to a position corresponding with the left hand position of the switch. This applies ground potential through switch 105 to the amplifier 104. Note that the second integrator 25 is always sampled at a time when control line 6 goes to 0, that is the switch 105 is set to its left hand position. At this time, the waveform *x* will be sampled and held on the capacitor 107 unless the waveform *x* exceeds the blanking level. In the latter case, ground potential is sampled and held on holding capacitor 107.

3.11 Adjustment of the Phase of the Bit Clock Control Pulses and the VCO Center Frequency The voltage on the storage capacitor 107 waveform *y*, indicates the magnitude of the phase error in the bit clock pulses. This bit phase error signal is displayed on the meter 32. By simultaneously observing this meter and adjusting the one shot multivibrators 87 and 88 the bit clock control pulses 1, 2 and 3 which control the first integrator 24 and sample and hold 26 can be made to coincide with the phase state changes in the waveform *k*, thus properly phasing the bit time intervals with the waveform *k*. When this is true, bit clock control pulses 4, 5 and 6 precisely frame the integration time of integrator 25 symmetrically about phase state changes in waveform *k*.

Note that the switch 115 can be set to its right hand position to display the control signal *e* on meter 32. When the system is in normal operation with phase lock loop 22 in proper phase lock, the control signal *e* is proportional to the differential between the frequency of the output signal $b$ and the center frequency of voltage controlled oscillator 57. The frequency control on the oscillator 57 may be adjusted to make the control signal $e$ zero thus making the oscillator center frequency the same as the output signal $b$. This adjustment is made during normal operation and provides a method of keeping the oscillator 57 tuned to the output signal irrespective of any drift in the frequency of either the oscillator or the output signal $b$.

3.12 Automatic Gain Control Circuitry

In order to assure proper operation of the phase lock loop 22, the amplitude of signal $c$ applied thereto is held substantially constant. The amplitude control is provided by amplifiers 51 and 52 and an associated automatic gain control circuit. The synchronously rectified signal $k$ is full wave rectified by the rectifier 116 and filtered by low pass filter 117. The output of filter 117 is applied to a differential amplifier 118 which compares the signal with an adjustable reference voltage $V_r$. Changes about the value of $V_r$ are applied to the amplifiers 51 and 52 to control the gain and to hold the amplitude of the output signal $b$ substantially constant.

4.00 Operation of the System

The operation of the receiver is depicted by the waveforms of FIGS. 4A, 4B, 5A, 5B, 6A and 6B. The waveforms are all idealized. It will be appreciated that all of the waveforms will have some "jitter" on them.

Figure 4B:
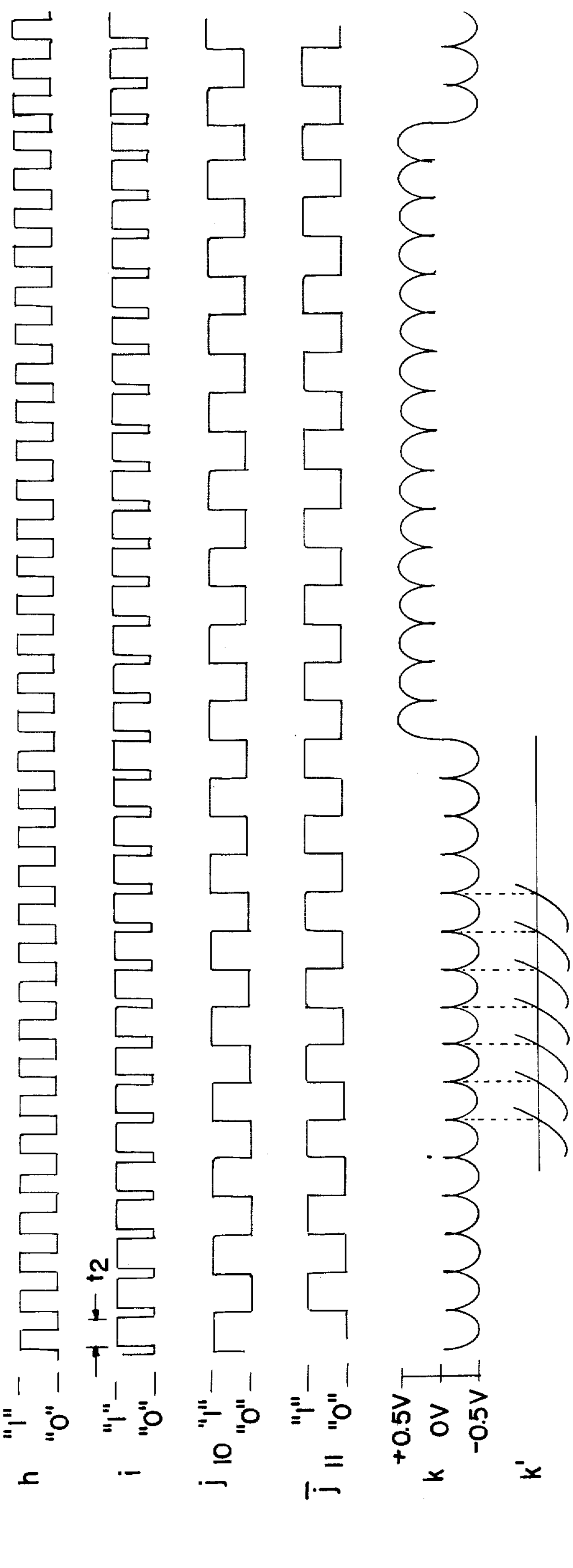
Figure 7A:
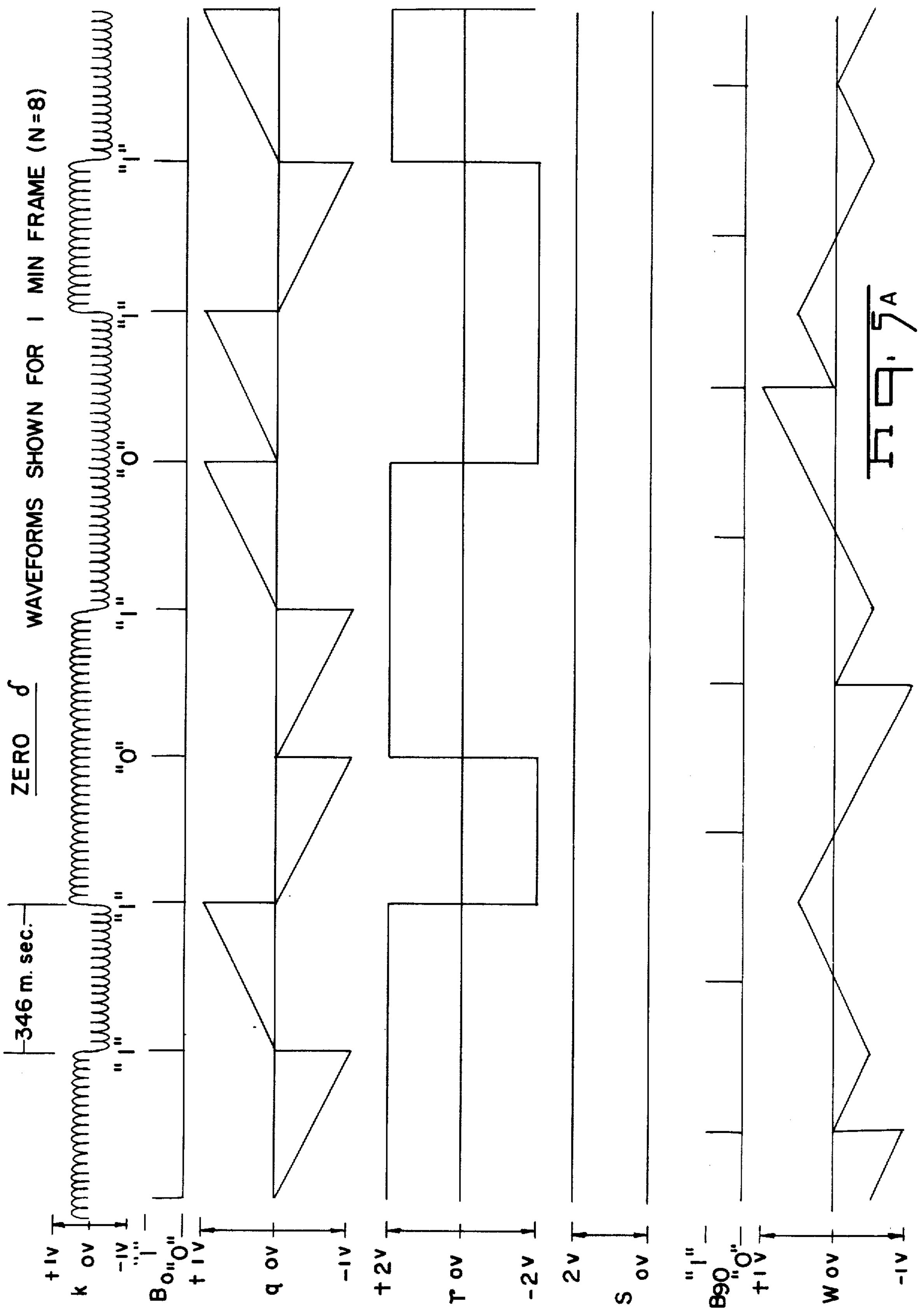

FIGS. 4A and 4B depict the coherent detection of a transmitted "1" from downhole. Note that there is a change in phase in the output signal $b$. This is detected and produces a transition in polarity in the synchronously rectified signal $k$. The waveform $k$ is produced by cross correlating the reference signal, waveforms $j$ and $\bar{j}$, with the output signal $b$.

It is important that the reference signal be highly stable and exactly synchronized with the output signal $b$. If it is not, the synchronously rectified signal may assume the waveform shown at $k'$. It will be appreciated that that the integral of $k'$ contains less signal energy than the integral of $k$. For this reason the use of the phase lock loop to produce the highly stable reference signal is important in a logging-while-drilling system in which efficient signal energy usage is critical.

The operation of the phase lock loop which produced the highly stable reference signal is depicted by waveforms $c$ through $i$. The control signal $e$ assumes the average value which drives the voltage controlled oscillator 57 such that the reference signal is in phase with the output signal $b$.

Figure 5B:
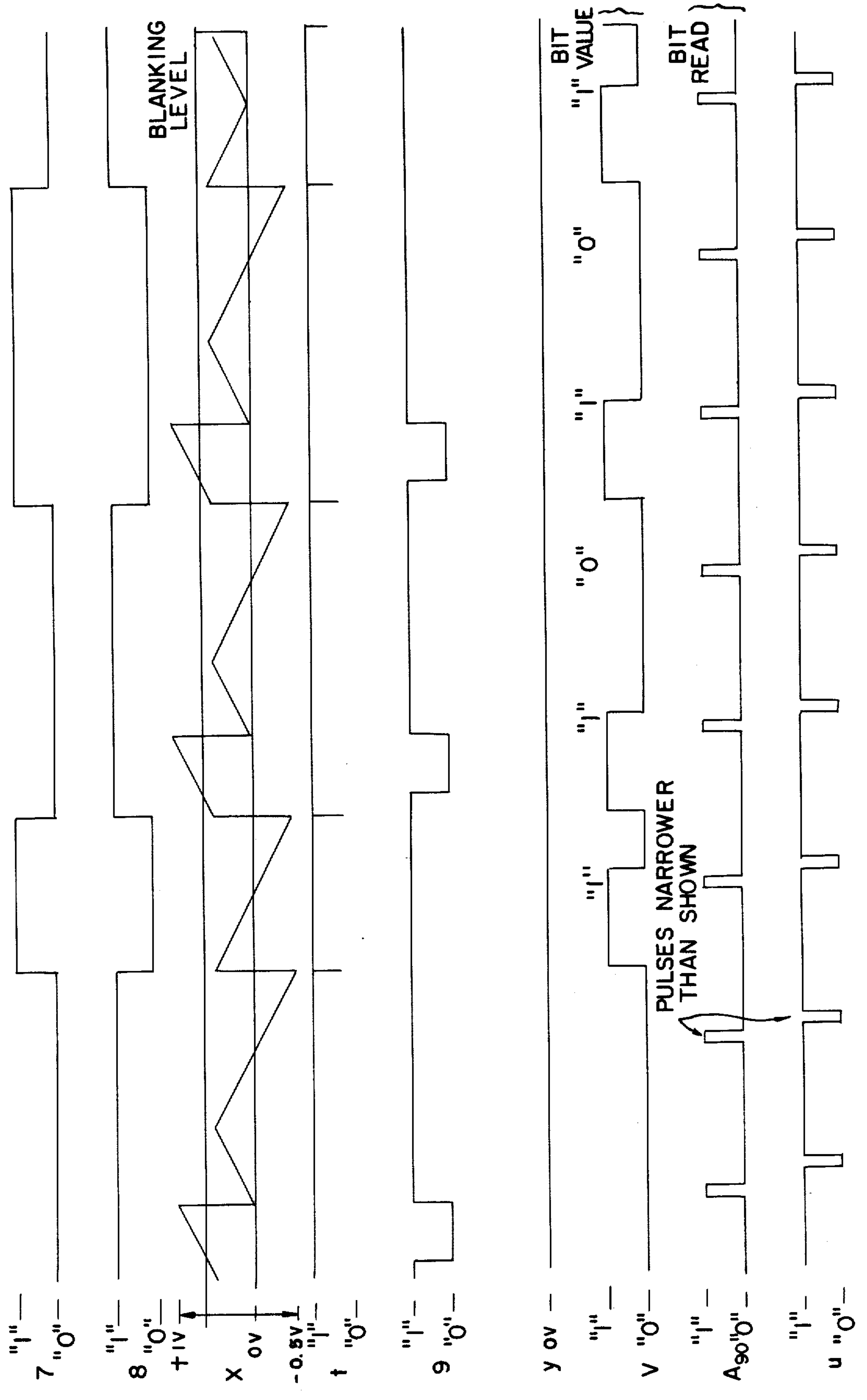

The wave forms of FIGS. 5A and 5B depict the conversion of the synchronously rectified signal $k$ into the bit value signal, waveform $v$. The transmitted message is 1101011. The "1's" are represented by transitions, or changes in polarity, in the synchronously rectified signal $k$. This is converted to a bit value signal $v$ having a "1" level or a "0" level at the times of the bit read pulses, waveform $A_{90}$.

The operation of the synchronous inverter 30 and the zero suppressor comparator 33 is also depicted by the waveforms. Note that the control line 7 switches to a "1" and the control line 8 switches to a "0" at the second phase state change in waveform $k$. The second transmitted "1" is represented by a minus to plus transition in the synchronously rectified signal, waveform $k$. This is contrasted to the first transmitted "1" which is represented by a plus to minus transition. Therefore, control lines 7 and 8 change the polarity of the waveform $x$ so that its polarity is the same regardless of the direction of polarity change of the synchronously rectified signal. (Actually, in the waveforms of FIG. 5 there is no bit phase error, because the waveforms depict a situation in which there is bit clock control pulse synchronization.)

Note also that the wave form $x$ exceeds the blanking level during those bit time intervals in which a "0" is transmitted. Therefore, zero suppressor comparator 33 produces an output during these times which applies ground potential to the sample and hold circuit 31 thus making the bit phase error signal $y$ zero when a "0" is transmitted.

Figure 6A:
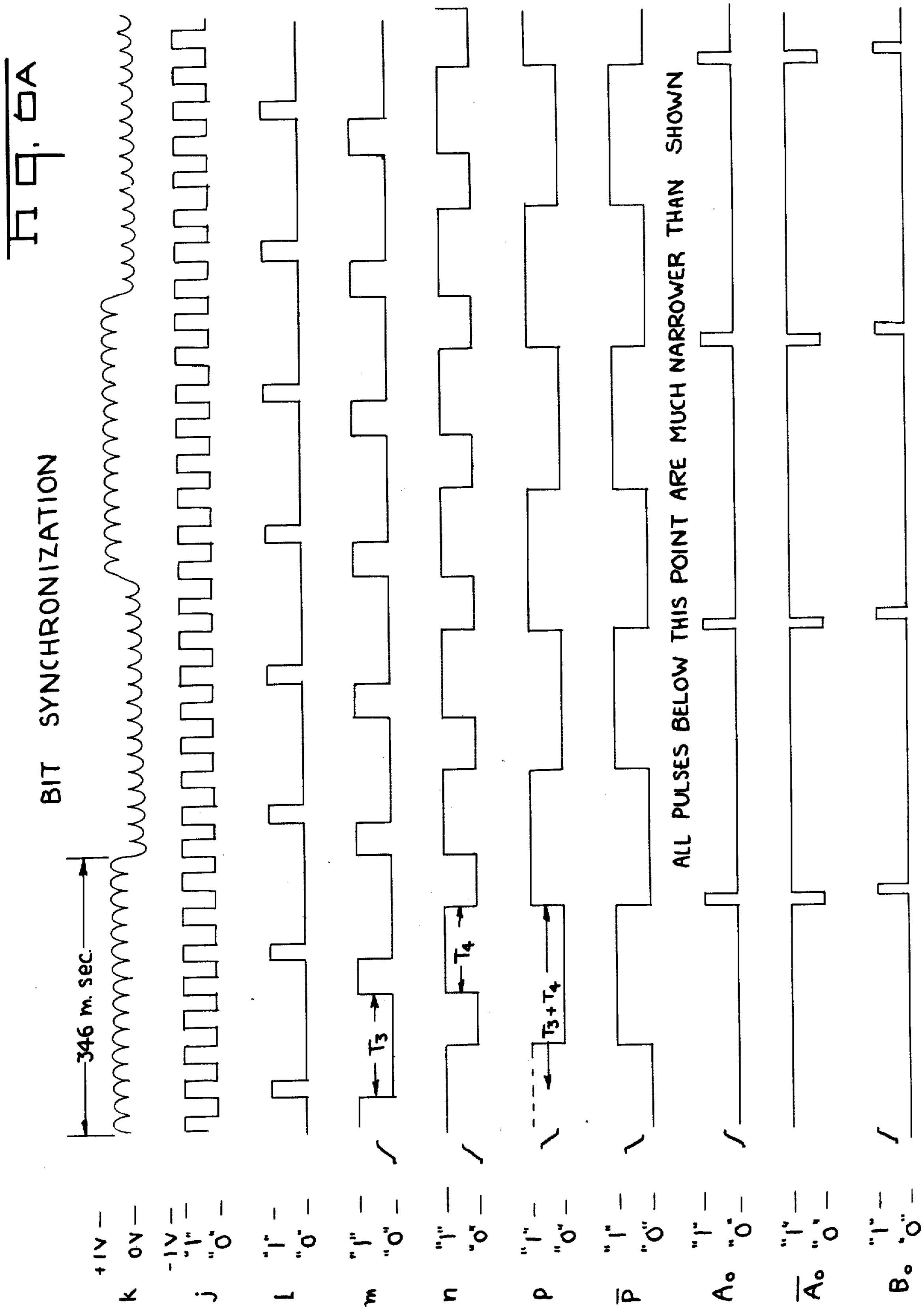
Figure 6B:
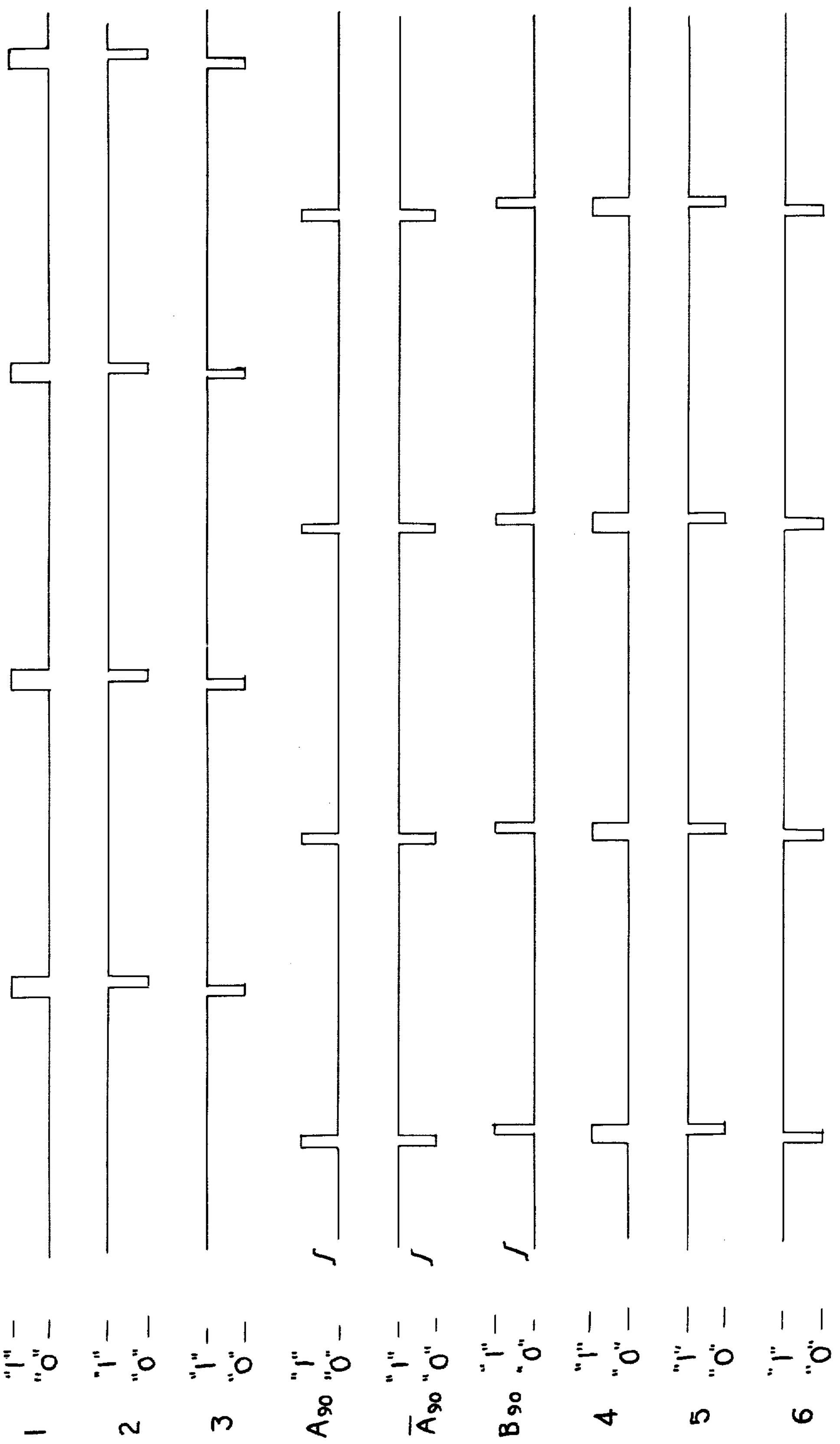

FIGS. 6A and 6B show the waveforms used in the generation of the bit clock control pulses. The bit read pulses, waveform $A_{90}$, together with the bit value signal, waveform $v$ in FIG. 5, are the two outputs from this system. Together, they represent the demodulated information transmitted from the downhole location by a phase modulated acoustic signal.

While a particular embodiment of the invention has been shown and described, it will be understood that various modifications are within the true spirit and scope of the appended claims.

What is claimed is:

1. In a system for logging-while-drilling wherein an acoustic signal is propagated through a liquid each from a downhole transmitter and the acoustic signal is modulated between two phase states in response to digitally coded data bits produced as a function of a downhole condition, and representation of each bit being propagated for a predetermined bit time interval, an improved receiving system for demodulating said acoustic waves comprising:

means responsive to the acoustic signal for producing an output signal representative of the phase and frequency of said acoustic signal, a reference signal generator responsive to said output signal for producing a reference signal having one phase state, that being one of the phase states of said output signal, a correlator, said output signal and said reference signal being applied to said correlator to produce a synchronously rectified signal whose polarity is representative of the phase states of said output signal, and means responsive to said reference signal for sampling said synchronously rectified signal to produce pulses representative of the generated bits and thus of the downhole condition.

2. The system recited in claim 1 further comprising:

a first integrator, said synchronously rectified signal being applied to said first integrator, means for sampling said first integrator at the end of each of said bit time intervals, and means for resetting said integrator at the end of each of said bit time intervals.

3. The system recited in claim 2 further comprising:

a second integrator, said synchronously rectified signal being applied to said second integrator, the integrating time of said second integrator being shifted by ½ bit time interval with respect to the integrating time of said first integrator, and means for sampling said second integrator at the midpoint of each of said bit time intervals, the sampled voltage being an error signal representing a phase error in the bit clock control pulses defining said bit time intervals.

4. The system recited in claim 2 further comprising: means for sensing the polarity of the sampled value of the output of the first integrator, and a synchronous inverter responsive to said means for sensing, said synchronous inverter changing the polarity of said error signal as necessary to make the polarity of the output of the synchronous inverter the same regardless of the direction of polarity change of the synchronously rectified signal during the integration period of said second integrator.

5. The system recited in claim 4 further comprising: means for sensing the absence of a polarity change of the synchronously rectified signal during the integration time of said second integrator, and means for suppressing said error signal when there is no change in this polarity in said integration time of said second integrator.

6. The system recited in claim 1 further comprising: frequency dividing means, said reference signal being applied to said frequency dividing means to divide it by the number of cycles in each bit of said output signal, the output of said frequency dividing means being a first set of bit clock control pulses which define said bit time intervals.

7. The system recited in claim 6 further comprising: means for changing the division ratio of said frequency dividing means so that said first set of bit clock control pulses match the number of cycles in each bit.

8. The system of claim 6 further comprising:

a second integrator, said synchronously rectified signal being applied to said second integrator, the integrating time of said second integrator being shifted by ½ bit time interval with respect to the integrating time of said first integrator, and means for generating a second set of bit clock control pulses shifted ½ bit time interval from said first set, said second set of control pulses being applied to said second integrator to sample said second integrator at the midpoint of each of said bit time intervals, the sampled voltage being an error signal representing a phase error in said first set of bit clock control pulses.

9. The system recited in claim 6 further comprising: means for changing the phase of said bit clock control pulses so that said first set of bit clock control pulses coincide with the phase state transitions of the output signal.

10. The system recited in claim 6 further comprising:

a sign change detector, the sampled output of said first integrator being applied to said sign change detector, and means responsive to said sign change detector for producing a bit value signal.

11. The system recited in claim 1 further comprising:

a bandpass filter, an electrical signal representing said acoustic signal being applied to said bandpass filter to produce said output signal, said bandpass filter eliminating the harmonics of said acoustic signal so that said harmonics are not multiplied by the harmonics of said reference signal in said correlator.

12. The system recited in claim 1 wherein reference signal generator includes:

a circuit for destroying the phase information of said output signal to produce a phase-free signal.

13. The system recited in claim 11 wherein said circuit is a squarer, said output signal being applied to said squarer to produce a squared signal that does not have said change in phase.

14. The system recited in claim 12 wherein said reference signal generator further includes a phase lock loop for producing a highly stable loop reference signal comprising:

a variable frequency oscillator producing said loop reference signal, and a phase detector, said phase-free signal and said loop reference signal being applied to said phase detector to produce an error signal representing the error in phase between said loop reference and said squared signal.

15. The system recited in claim 14 wherein said phase lock loop includes a loop filter which generates a control signal comprising:

means for producing an error signal component, means for integrating said error signal to produce an integral component, means for mixing said integral component and said error signal component, and means for changing the amplitudes of the mixed integral and error signal components to determine the noise band width and damping of said phase lock loop.

16. The system recited in claim 14 wherein said phase lock loop includes a loop filter which generates a control signal comprising:

means for changing the bandwidth of said loop; and means for simultaneously changing the damping of said filter to maintain the optimum acquisition time consistent with said bandwidth.

17. The system recited in claim 16 wherein said damping factor is maintained at a constant value of about 0.5.

18. The system recited in claim 16 wherein said noise bandwidth is set at values of 1, 0.1 and 0.01 Hz.

19. The system recited in claim 14 wherein said phase lock loop includes a loop filter which generates a control signal comprising:

means for producing an error signal component, means for integrating said error signal to produce an integral component, and means for adjusting the amplitude of the said error signal component and the said integral component to determine the noise bandwidth and damping of said phase lock loop.

* * * * *